US008792679B2

(12) United States Patent
Sengupta et al.

(10) Patent No.: US 8,792,679 B2
(45) Date of Patent: Jul. 29, 2014

(54) LOW-LIGHT FACE DETECTION

(75) Inventors: Kuntal Sengupta, Winchester, MA (US); Robert Calder, Burlington, MA (US)

(73) Assignee: Imprivata, Inc., Lexington, MA (US)

( * ) Notice: Subject to any disclaimer, the term of this patent is extended or adjusted under 35 U.S.C. 154(b) by 106 days.

(21) Appl. No.: 13/606,820

(22) Filed: Sep. 7, 2012

(65) Prior Publication Data

US 2013/0114853 A1 May 9, 2013

Related U.S. Application Data

(60) Provisional application No. 61/532,888, filed on Sep. 9, 2011.

(51) Int. Cl.
*G06K 9/00* (2006.01)
(52) U.S. Cl.
USPC .......................................... 382/103; 382/274
(58) Field of Classification Search
None
See application file for complete search history.

(56) References Cited

U.S. PATENT DOCUMENTS

| 7,103,227 | B2 * | 9/2006 | Raskar et al. | 382/266 |
| 8,447,132 | B1 * | 5/2013 | Galil | 382/274 |
| 2003/0012414 | A1 * | 1/2003 | Luo | 382/118 |
| 2010/0295962 | A1 * | 11/2010 | Terauchi | 348/222.1 |

OTHER PUBLICATIONS

Paul Debevec, Tim Hawkins, Chris Tchou, Haarm-Pieter Duiker, Westly Sarokin, and Mark Sagar, "Acquiring the Reflectance of a Human Face", 2000, Siggraph 2000 Conference Proceedings, pp. 1-12.*
A.S. Georghiades, Peter N. Belhumeur, and David J. Kriegman, "Illumination-Based Image Synthesis: Creating Novel Images of Human Faces Under Differing Pose and Lighting", 1999, IEEE Workshop on Mulyi-view Modeling and Analysis of Visual Scenes, pp. 1-8.*

* cited by examiner

*Primary Examiner* — Bhavesh Mehta
*Assistant Examiner* — Siamak Harandi
(74) *Attorney, Agent, or Firm* — Bingham McCutchen LLP

(57) ABSTRACT

A face is detected within a camera's field despite inadequate illumination. In various embodiments, multiple images of the inadequately illuminated field of view are obtained and summed into a composite image. The composite image is tone-mapped based on a facial lighting model, and a bounded group of pixels in the tone-mapped image having a lighting distribution indicative of a face is identified. Facial features are resolved within the bounded group of pixels.

21 Claims, 8 Drawing Sheets

LOW-LIGHT FACE DETECTION

CROSS-REFERENCE TO RELATED APPLICATION

This application claims priority to and the benefit of, and incorporates herein by reference in its entirety, U.S. Provisional Patent Application No. 61/532,888, which was filed on Sep. 9, 2011.

FIELD OF THE INVENTION

In various embodiments, the present invention relates generally to systems and methods for detecting faces and capturing facial features.

BACKGROUND

Personal identification and security checks represent an integral part of maintaining security in a wide variety of environments, ranging from, e.g., transportation terminals to computer security. A variety of systems and methods exist for identifying an individual based on personal biometric information, which is compared to previously stored data, or using identifications that include photographic images, which may be scanned at an entry point. Unlike biometric techniques, such as fingerprint recognition and the like, face recognition bases identification on unique bio-information but does not require bodily contact with a recognition apparatus or even cooperation by the individual seeking entry.

Conventionally, facial-recognition approaches to identifying and/or verifying a human face first detect the presence of the face (and/or facial features) in a digital image or a video frame and then compare the detected face and/or facial features with those stored in a facial database. A highly accurate detection rate of the face and/or facial features is thus critical in the facial-recognition system.

A face in an image is typically detected by first transforming pixels in a scanning window of the acquired image into various regions or discrete features; a classifier trained on example faces then determines whether pixels in this scanning window are part of the face. This scanning window slides through the entire captured image to determine the location and size of the face. Accurate face detection may be challenging because the appearance of the face can depend upon changes in illumination, posture, and movement. For example, if the person moves during face detection, a shaded region may appear on his/her face due to changes in the spatial relationship between a light source and the person; this may reduce contrast between the face and background of the captured image, thereby increasing the difficulty in distinguishing the face from the background. Reliably detecting a face in a cluttered visual environment represents another challenge. Moreover, these difficulties may be exacerbated in poor lighting conditions, where facial detection may fail altogether, and have limited the widespread adoption of facial identification.

Consequently, there is a need for a facial detection technique that can identify a face and/or facial features reliably and that is robust against variations in ambient illumination and face movement.

SUMMARY

In various embodiments, the present invention relates to systems and methods for reliably detecting a face within a field of view of an image-capturing device (e.g., a digital camera) and resolving facial features despite inadequate illumination and/or face movement. A set of consecutive image frames containing a face is first obtained using an image-capturing device that has a time-varying gain factor (e.g., cycling between a low value and a high value as a function of time); at least some of the image frames are associated with different gain factors (e.g., different brightness or background noise). The pixel value at each pixel position within each image frame is then summed throughout the set of consecutive image frames. A tone-mapping technique, which maps an image that has a higher dynamic range of pixels to another that has a more limited dynamic range, is applied to the summed composite image. The tone-mapped composite image may then be analyzed to detect faces and resolve facial features with improved accuracy. The positions of the facial regions may, for example, first be randomly chosen using a statistical sampling technique, e.g., Monte Carlo sampling. The statistical distribution of the facial regions is then updated based on the results of the face detection and/or user inputs. Accordingly, the location and size of the face and/or facial features may be determined quickly and without sliding a scanning window over the entire captured image. Additionally, because the brightness and noise associated with each image varies with the gain factor, the tone-mapped composite image provides a reliable face template for face detection and recognition in ambient illumination.

In various embodiments, the motion of the face image across the set of consecutive image frames is detected by comparing each image with an image chosen as a reference from the set of consecutive frames. Each image from the unselected images is then rectified against the selected reference image to compensate for the motion, and the composite image is created by summing the rectified images. As a result, the rectified composite image eliminates the image blurring caused by face motion, thereby providing a high-quality template for face detection.

Accordingly, in one aspect, the invention pertains to a method of detecting a face within a camera's field of view to resolve facial features despite inadequate illumination. In various embodiments, the method includes obtaining multiple images of the inadequately illuminated field of view, summing the images into a composite image, tone-mapping the composite image based on a facial lighting model, locating a bounded group of pixels in the tone-mapped image having a lighting distribution indicative of a face, and resolving facial features within the bounded group of pixels. In one implementation, at least some of the images are obtained at different gain factors. For example, the gain factor may vary with time and the images may be obtained successively in time.

In various embodiments, the images cover the same field of view within an image frame and summing the images includes adding pixel values at each pixel position within the image frame. For example, if there are M images (M>1) and each of the images has a pixel value range of 0 to $N_m$ ($N_m \leq 255$), the composite image has a pixel value range of 0 to $\Sigma_{m=1}^{m=M} N_m$. Every pixel value in the range of 0 to $\Sigma_{m=1}^{m=M} N_m$ of the composite image may be tone-mapped to a range of 0 to 255 such that a histogram of the tone-mapped composite image corresponds to a model histogram computed based on the facial lighting model.

In some embodiments, the method further includes a step of identifying, within the frame, a target region where a face is likely to be detected; for example, the target region may have borders determined at least in part by locations of previously detected face images within the field of view. The tone-mapping and locating steps are then performed first within the target region. In one embodiment, the target region is identified using a statistical distribution of facial positions in multiple previously obtained images. The statistical distribution may be generated using, for example, Monte Carlo statistical sampling, and updated either automatically upon detection of a face in an image or manually by a user pointing and clicking at a face in the tone-mapped composite images.

The facial lighting model may be based on image relighting. In one embodiment, the facial lighting model is a histogram lighting distribution based on average pixel values across multiple images of evenly lit images of faces. In addition, the method may include selecting one of the images as a reference image and rectifying the unselected images against the reference image in order to compensate for motion in the composite image.

In another aspect, the invention relates to an apparatus for detecting a face within a camera's field of view to resolve facial features despite inadequate illumination. In various embodiments, the apparatus includes a memory for electronically storing multiple digital images of the inadequately illuminated field of view, an image summer for summing the images into a composite image, and a processor for executing (a) tone-mapping module for tone mapping the composite image based on a facial lighting model and (b) an analysis module. The analysis module locates a bounded group of pixels in the tone-mapped image having a lighting distribution indicative of a face, and resolves facial features within the bounded group of pixels. In one implementation, at least some of the images are obtained at different gain factors. For example, the gain factor may vary with time and the images may be obtained successively in time. In some embodiments, the analysis module is further configured to detect motion within at least some of the images.

In various embodiments, the memory stores M images (M>1) and each of the images has a pixel value range of 0 to $N_m$, where $N_m \leq 255$; the composite image thus has a pixel value range of 0 to $\Sigma_{m=1}^{m=M} N_m$. In one embodiment, the tone-mapping module tone-maps every pixel value in the range of 0 to $\Sigma_{m=1}^{m=M} N_m$ of the composite image to a range of 0 to 255 such that a histogram of the tone-mapped composite image corresponds to a model histogram computed based on the facial lighting model.

As used herein, the terms "substantially" means±10% (e.g., by lighting-intensity), and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
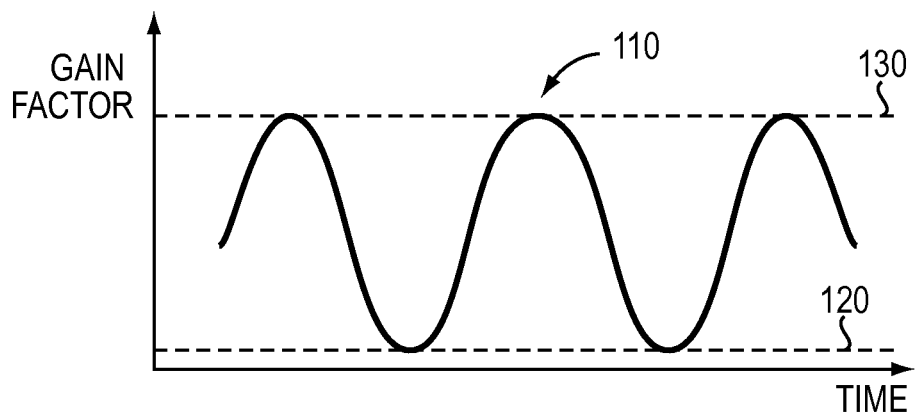
FIG. 1 graphically illustrates a gain factor in an image-acquiring device varying with time in accordance with embodiments of the current invention.

The gain of a camera is a value set electronically to brighten a dark picture image in the camera; gain, in other words, represents amplification, so that a relatively small amount of detected light nonetheless gives rise to a correspondingly high (i.e., bright) pixel value. Adjusting the gain value varies the brightness but also the noise associated with an image. For example, increasing the gain value can boost signals from the camera to artificially create a brighter image in a location that does not have a sufficient light source, but at the price of increased image noise. Conversely, a reduced gain value may be necessary to generate a high-quality image—i.e., one having an adequate dynamic range—when the environment is extremely bright. As a result, varying the gain is often the best way to obtain a usable image when there is no control of lighting at a location. Referring to FIG. 1, in one embodiment of the present invention, the gain factor 110 of an image-acquiring device (e.g., a digital camera) varies with time; for example, the gain factor cycles between a low value (e.g., 0.2) 120 and a high value (e.g., 0.5) 130. Although FIG. 1 depicts sinusoidal variation, the present invention is not limited to any particular waveform or temporal pattern; one of ordinary skill in the art will understand that different variations of the gain factor with time are within the scope of the current invention.

Figure 2A:
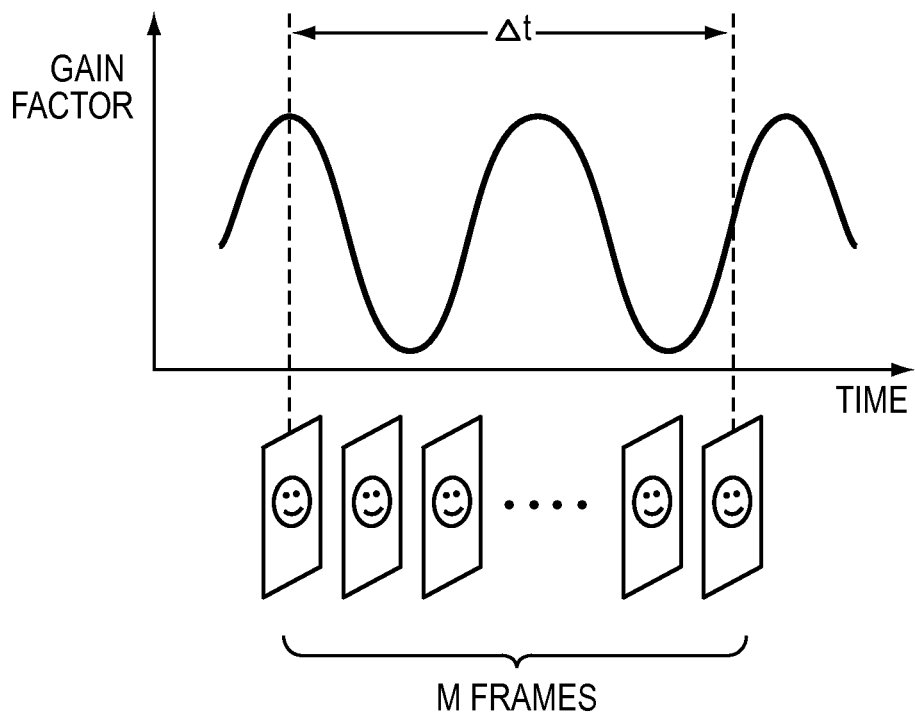
FIG. 2A graphically illustrates M consecutive image frames, each containing a face, obtained using the image-acquiring device.
Figure 2B:
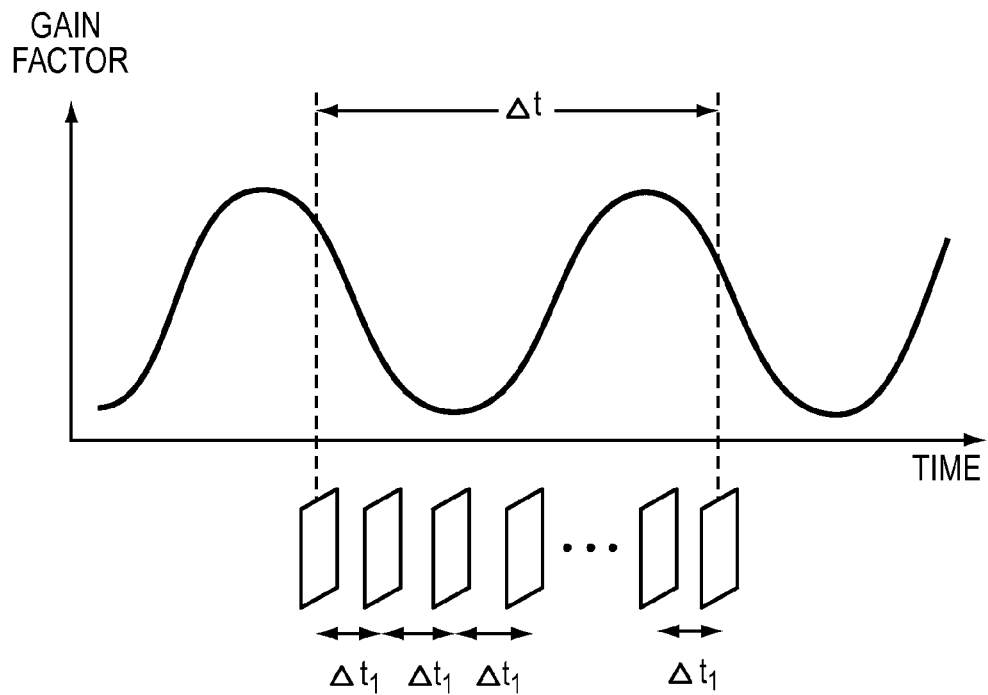
FIG. 2B graphically depicts a fixed-value time interval between image frames in accordance with embodiments of the current invention.
Figure 2C:
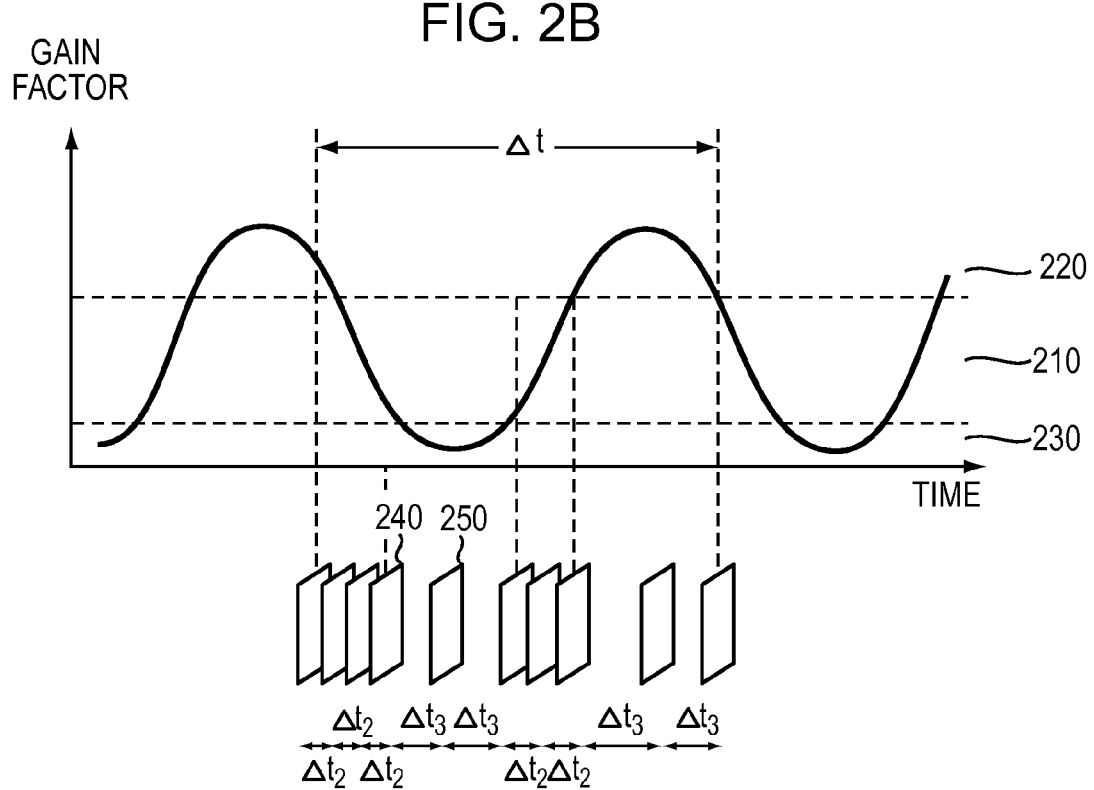
FIG. 2C graphically depicts a time interval between image frames that varies in accordance with the changing gain factor.

Referring to FIG. 2A, at any time interval Δt, M consecutive frames of images containing a face may be taken within the image-acquiring device's field of view under inadequate illumination. In one embodiment, at least some image frames are captured with different gain factors (producing different brightness amplifications and background noise). For example, each image frame of the M consecutive face image frames may be associated with a different gain factor; each frame thus has a dynamic range of pixel values representing a band within the outer boundaries of 0 and $P_{max}$, where $P_{max}$ is a function of the imaging hardware; for example, $P_{max}$ may be equal to 255. The gain factor determines the maximum pixel value $N_m$ that defines the dynamic range for a particular frame m ($1 \leq m \leq M$), where $N_m$ is equal to or less than $P_{max}$; if $N=P_{max}=255$, then the dynamic range is ([0, 255]); a face image frame captured with a relatively large gain factor has a larger N value. Referring to FIG. 2B, in one embodiment, the time interval (or frame rate) between each frame is a fixed value $\Delta t_1$. In another embodiment, with reference to FIG. 2C, the time interval (or frame rate) varies according to the changing rate of the gain factor. For example, the frame rate may be equal or proportional to the rate of change of the gain factor. A larger number of image frames (i.e., separated by a smaller time interval $\Delta t_2$) are captured in a region 210 where the gain factor changes rapidly with time, whereas fewer image frames (i.e., separated by a larger time interval $\Delta t_3$) are taken in regions 220, 230 where the gain factor changes more slowly with time. In one embodiment, various frame rates are achieved by dropping a certain number of frames. For example, suppose the smaller time interval $\Delta t_2$ is set ⅓ of a second; dropping two frames between frames 240 and 250 results in a larger frame rate $\Delta t_3$ of one second.

Figure 3:
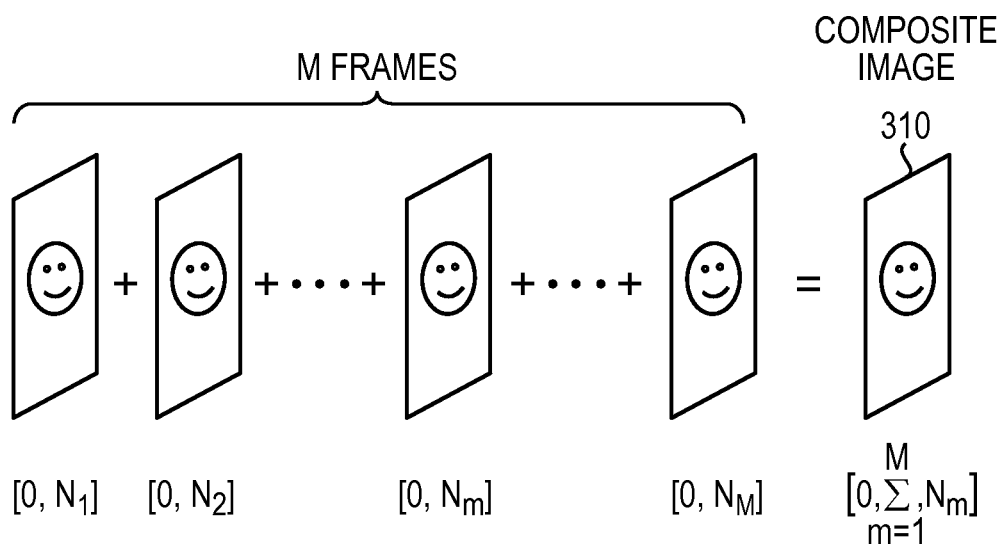
FIG. 3 schematically depicts a composite image summed from the captured M frames of face images.

Referring to FIG. 3, the captured M frames of face images are then summed into a composite image. The pixel value at each pixel position within each image frame is added throughout the M frames; the composite image thus has dynamic pixel values ranging from 0 to $\Sigma_{m=1}^{m=M} N_m$ ([0, $\Sigma_{m=1}^{m=M} N_m$]). A tone-mapping technique, which maps one set of colors to another set to approximate the appearance of high-dynamic-range images in an image that has a more limited dynamic range, is then applied to the composite image. Tone-mapping algorithms are well-known in the art and include perceptually based algorithms, bilateral filtering, gradient-field manipulation, and others.

Figure 4A:
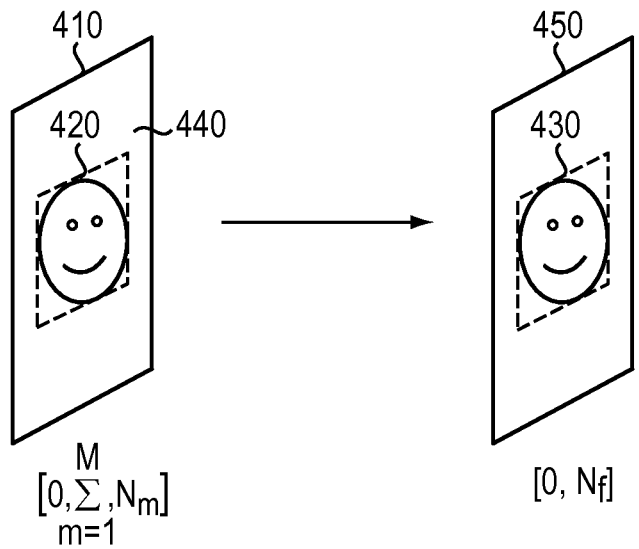
FIG. 4A schematically depicts a composite image having pixel values of $[0, \Sigma_{m=1}^{m=M} N_m]$ tone mapped to a grayscale of $[0, N_f]$.

With reference to FIGS. 3 and 4A, a composite image 410 with the grayscale of [0, $\Sigma_{m=1}^{m=M} N_m$] contains a hypothesized face region 420, where a face is likely to be detected. The hypothesized face region 420 having a size of, for example, 100×100 pixels may be randomly chosen anywhere in the composite image 410. In some embodiments, the position of the hypothesized face region 420 is chosen using Monte Carlo statistical sampling, i.e., a face-hunting process. Monte Carlo statistical sampling assumes that the position of the hypothesized face region 420 generally follows a certain statistical distribution (e.g., a Gaussian distribution); this statistical distribution may be characterized over time for a particular workstation (based on a usage pattern) or from data across workstations characterizing where faces usually appear in images. For example, because the image-acquiring device is typically oriented such that the captured face is located in the center of the field of view, the likelihood of detecting a face in an image increases toward the center thereof.

The statistical distribution of face positions may be generated prior to face detection. In one embodiment, the statistical distribution is updated during the login step of the face-hunting process. For example, when a hit on a face occurs— i.e., when a face detector successfully detects a face during the login process—the position of the detected face region is stored in a database and the statistical distribution is updated accordingly. The face detector may be, for example, a Viola-Jones face detector that finds a tightly bound region corresponding to a face; see, e.g., U.S. Ser. No. 12/547,100, filed on Aug. 25, 2009, the entire disclosure of which is hereby incorporated by reference. In another embodiment, the statistical distribution is updated manually by having users point and click at a face (thereby indicating its position) on the screen of a live display video. The updated statistical distribution of face positions is utilized in the face-hunting process.

The chosen hypothesized face region 420 that has pixel values ranging from 0 to $\Sigma_{m=1}^{m=M} N_m$ ([0, $\Sigma_{m=1}^{m=M} N_m$]) is first tone-mapped to the grayscale of [0, $N_f$] based, for example, on a facial lighting model, where $N_f$ is the maximum pixel value in the facial lighting model. The facial lighting model may be a histogram of the lighting-intensity distribution based on average pixel values across substantially evenly lit face images in a database; this model can be constructed, for example, offline using a conventional image relighting process. Given one or more images of some scene, the image relighting process may involve computing what that scene would look like under some other (arbitrary) lighting conditions—e.g., changing the positions and colors of the light sources utilizing readily available graphics hardware or software. Image relighting thus facilitates synthetic alteration of the illumination of frontal face images in a database. For example, an image relighting process may be a simulation that tracks the energy flow of light interacting with faces using standard computational techniques. In some embodiments, the frontal face images are first cropped in the captured images prior to the relighting simulations to reduce the required processing time and system requirement.

Figure 4B:
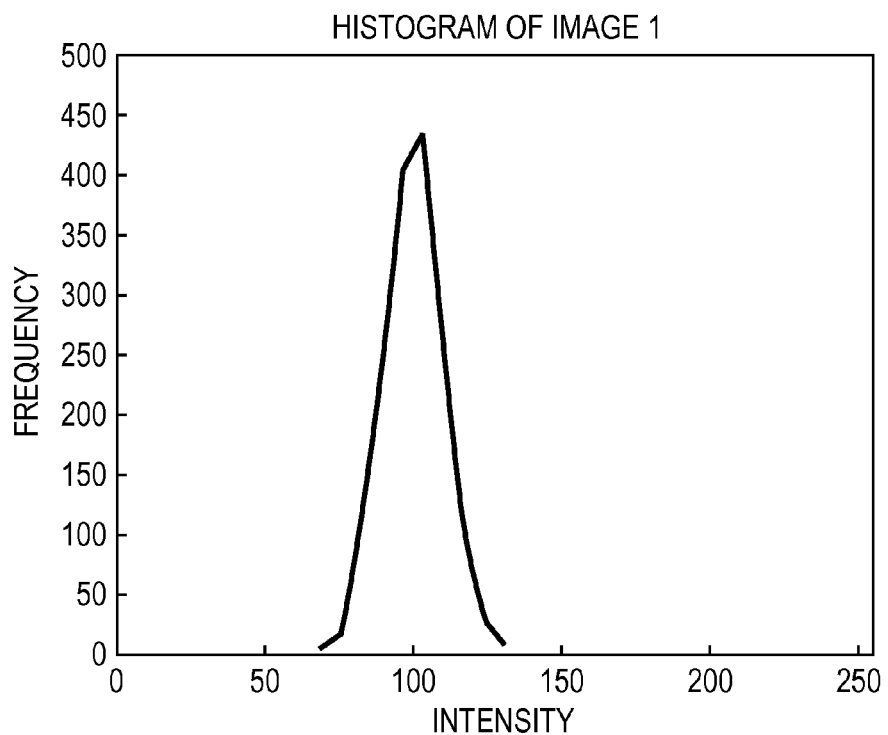
FIGS. 4B and 4C depict histogram distributions of the pixel values in two image frames.
Figure 4C:
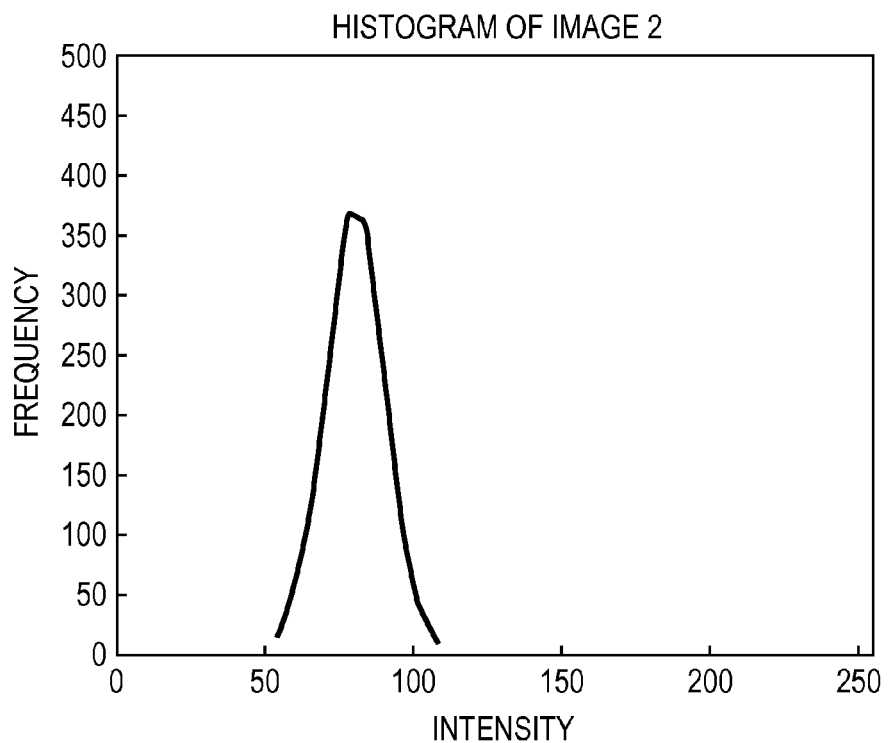
Figure 4D:
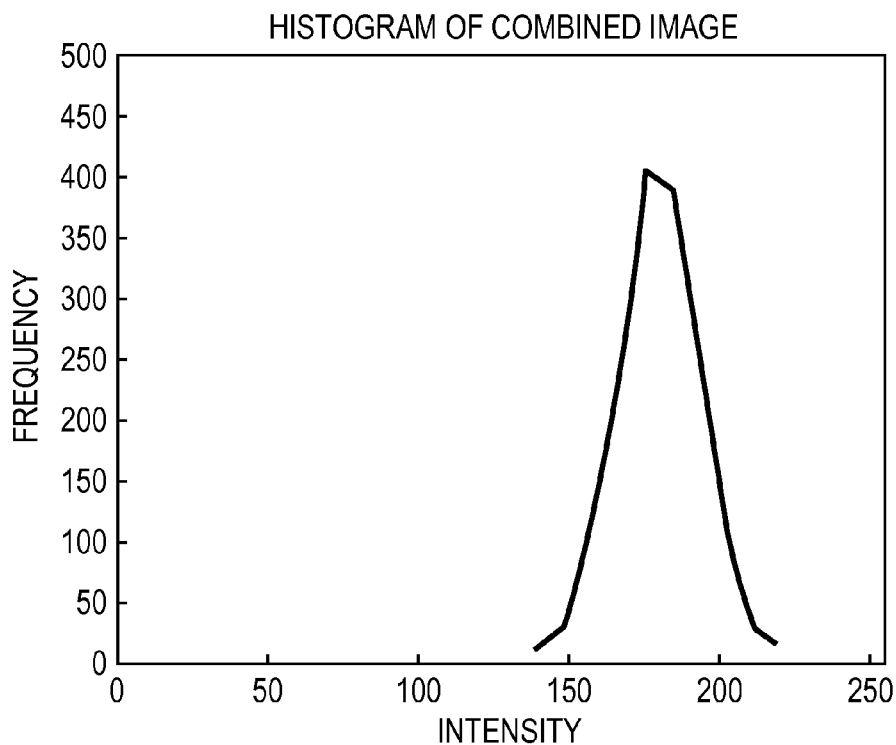
FIGS. 4D and 4E depict the histogram distributions of the intensities in the composite image and the facial lighting model, respectively.
Figure 4E:
Figure 4F:
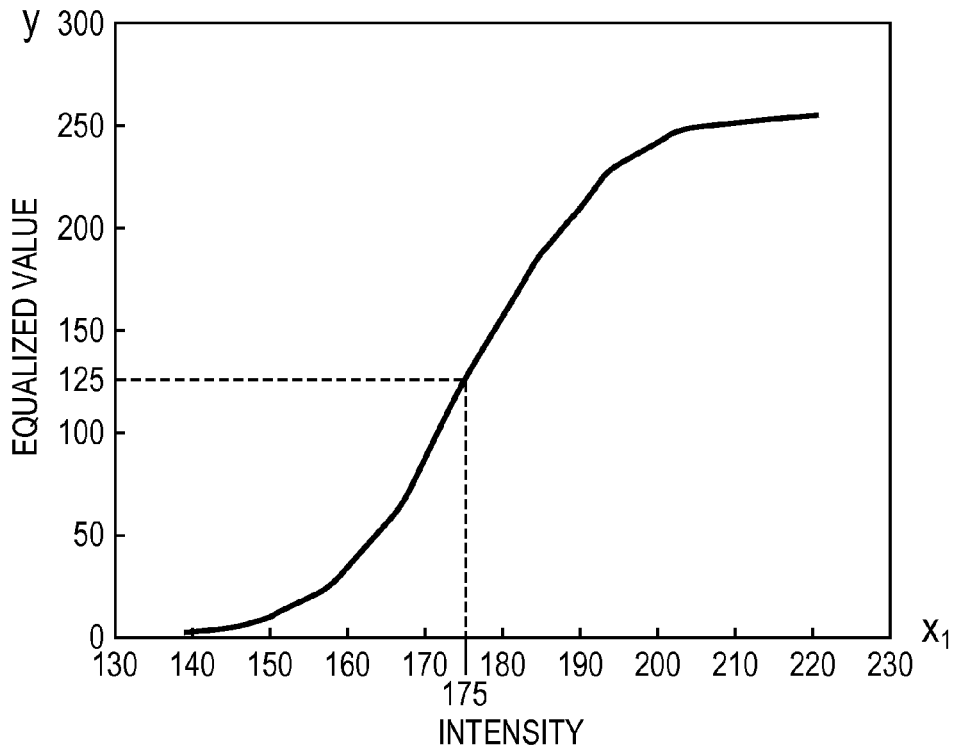
FIGS. 4F and 4G depict the converted cumulative intensity distributions in the composite image and the facial lighting model, respectively.
Figure 4G:
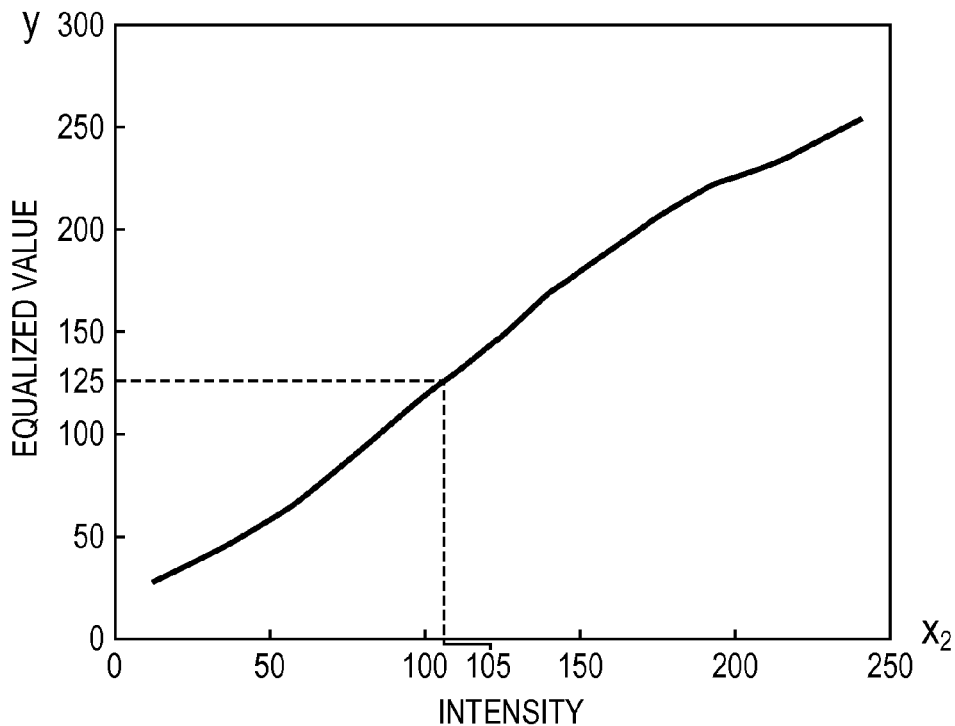

The tone-mapping technique utilizes an estimated mapping function $f\{[0, \Sigma_{m=1}^{m=M} N_m] \rightarrow [0, N_f]\}$ that maps the histogram of the intensity in the hypothesized face region 420 to the histogram of the average intensity of a face 430 obtained using the facial lighting model. To estimate the mapping function $f$, a histogram of the hypothesized face region 420 in the composite face image is first constructed, with the x-axis values of the histogram ranging from 0 to $\Sigma_{m=1}^{m=M} N_m$. The function $f$ then maps every pixel value in the range of [0, $\Sigma_{m=1}^{m=M} N_m$] to the range of [0, $N_f$], such that the histogram of the final mapped composite image resembles a model histogram computed from the database of lit facial images. In one embodiment, the tone-mapping function is a non-linear function that uses the luminance and/or other global variable(s) to map the images. For example, FIGS. 4B and 4C depict histogram distributions of the pixel values in the hypothesized face regions of two image frames that are combined to create a composite image; FIGS. 4D and 4E illustrate histogram distributions of the intensities in the composite image and the facial lighting model, respectively. In various embodiments, the histogram distributions of the intensities in the composite image (FIG. 4D) and facial lighting model (FIG. 4E) are converted to cumulative intensity distributions. In one implementation, as shown in FIGS. 4F and 4G, respectively, this is followed by normalizing the cumulative frequencies by, for example, a value of 255, so that the total number of pixels in the composite image and the facial lighting model are the same—i.e., they are equalized as indicated in the figure so the scale is the same. Every pixel value $x_1$ in the cumulative intensity plot of the composite image (FIG. 4F) is tone-mapped to the corresponding pixel value $x_2$ in the cumulative intensity plot of the facial lighting model (FIG. 4E) based on the equalized pixel number y. For example, a pixel intensity of 175 in the composite image is tone-mapped to a pixel intensity of 105 in the facial lighting model based on an equalized pixel number of 125. Once an optimal function for mapping is derived or identified, every pixel in the hypothesized face region 420 is mapped in the same way; this approach may be quickly implemented using a look-up table because every pixel brightness value in the source image corresponds to (and is replaced with) a specific corresponding value dictated by the selected function. In another embodiment, the tone-mapping function $f$ is a non-linear function that changes for each pixel of the hypothesized face region 420 based on local features (e.g., a pixel gradient) of the image. Though this approach may require more processing time, it provides good contrast. The tone-mapping function $f$, obtained based on the hypothesized face region 420, is then applied to the remaining area—i.e., regions 440 outside the hypothesized face region 420 of the image 410. The completely tone-mapped composite image 450 may then be analyzed to identify facial features. For example, a group of pixels in an area of the completely tone-mapped composite image 450 having a histogram of intensities similar to that of the facial region in the facial lighting model may first be identified as a face; based on the region of this bounded group of pixels, face features therewithin can be resolved. Additionally, the completely tone-mapped composite image 450 may serve as an estimation template that may be directly compared with a later captured image expected to contain the same individual's face, thereby avoiding the tone-mapping and intensity analysis described above. The comparison may be, for example, a simple image correlation that not only reduces the computational burden of face recognition but, because a face is already presumed to be in the image, decreases acquisition failure in the template capture process.

In various embodiments, motion of the face image across the captured M image frames is detected by comparing each image with an image in a selected reference image frame, which is typically chosen from the M frame images. Each of the unselected images is then rectified against the reference image to compensate for the motion, and the composite image is created from the rectified images. As a result, the rectified composite image compensates the blurring due to face movement during face detection.

Figure 5:
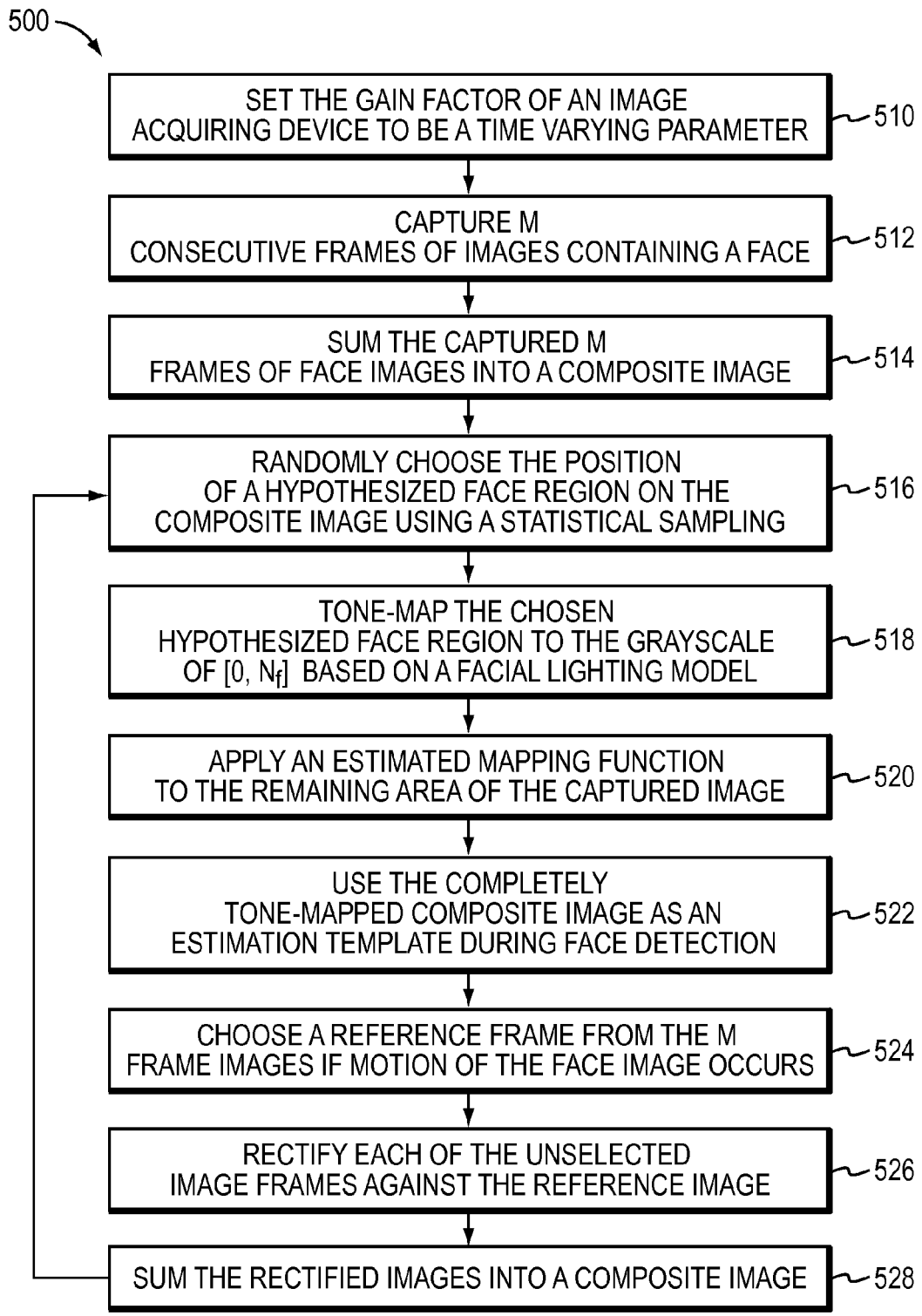
FIG. 5 is a flow chart illustrating a method of detecting low-light level faces in accordance with embodiments of the current invention.

A representative method 500 illustrating the operation and use of a low-light face detection system in accordance with embodiments of the current invention is shown in FIG. 5. In a first step 510, the gain factor of the image-acquiring device is set to be a time varying parameter. In a second step 512, M consecutive frames of images containing a face are taken within the image-acquiring device's field of view, where the frames are separated temporally by a time interval $\Delta t$, under inadequate illumination. In a third step 514, the captured M frames of face images are summed into a composite image. The position of a hypothesized face region on the composite image is randomly chosen using, for example, Monte Carlo statistical sampling in a fourth step 516. The chosen hypothesized face region that has pixel values ranging from 0 to $\Sigma_{m=1}^{m=M} N_m$ ($[0, \Sigma_{m=1}^{m=M} N_m]$) is then tone-mapped to the grayscale of $[0, N_f]$ using an estimated mapping function $f\{[0, \Sigma_{m=1}^{m=M} N_m] [0, N_f]\}$ based on a facial lighting model (step 518). In particular, the estimated mapping function $f\{[0, \Sigma_{m=1}^{m=M} N_m] \rightarrow [0, N_f]\}$ tone maps the histogram of the intensity in the hypothesized face region to the histogram of the intensity of a face derived using the facial lighting model. The facial lighting model can be constructed offline, prior to face detection, using an image relighting process. The estimated mapping function is then applied to the remaining area of the captured image (step 520). The completely tone-mapped composite image is then analyzed for facial features and/or template estimation during face detection (step 522). If motion of the face image occurs (or is likely) during capture of the M image frames, a reference frame is chosen from the M frame images (step 524). Each of the unselected image frames is then rectified against the reference image to compensate for the face motion (step 526) and the composite image is created from the rectified images (step 528). As described above, the rectified composite image is then tone-mapped to the grayscale of $[0, N_f]$ and used as the estimation template during face detection.

Detection of poorly lit faces in accordance with the invention, and applications based thereon, can be carried out efficiently with a general-purpose computing device in the form of a computer system. The system can be an individual computer, or a network of computers connected, for example, via the Internet, an intranet, and/or a local or wide area network. If a network is utilized, the computational load can be distributed over multiple computers. In some embodiments, one or more computers are designated as servers which carry out certain functionalities, and the remaining computers are clients. However, this distinction need not apply to all embodiments. Depending on the particular application, some implementations may be preferred over others.

Figure 6:
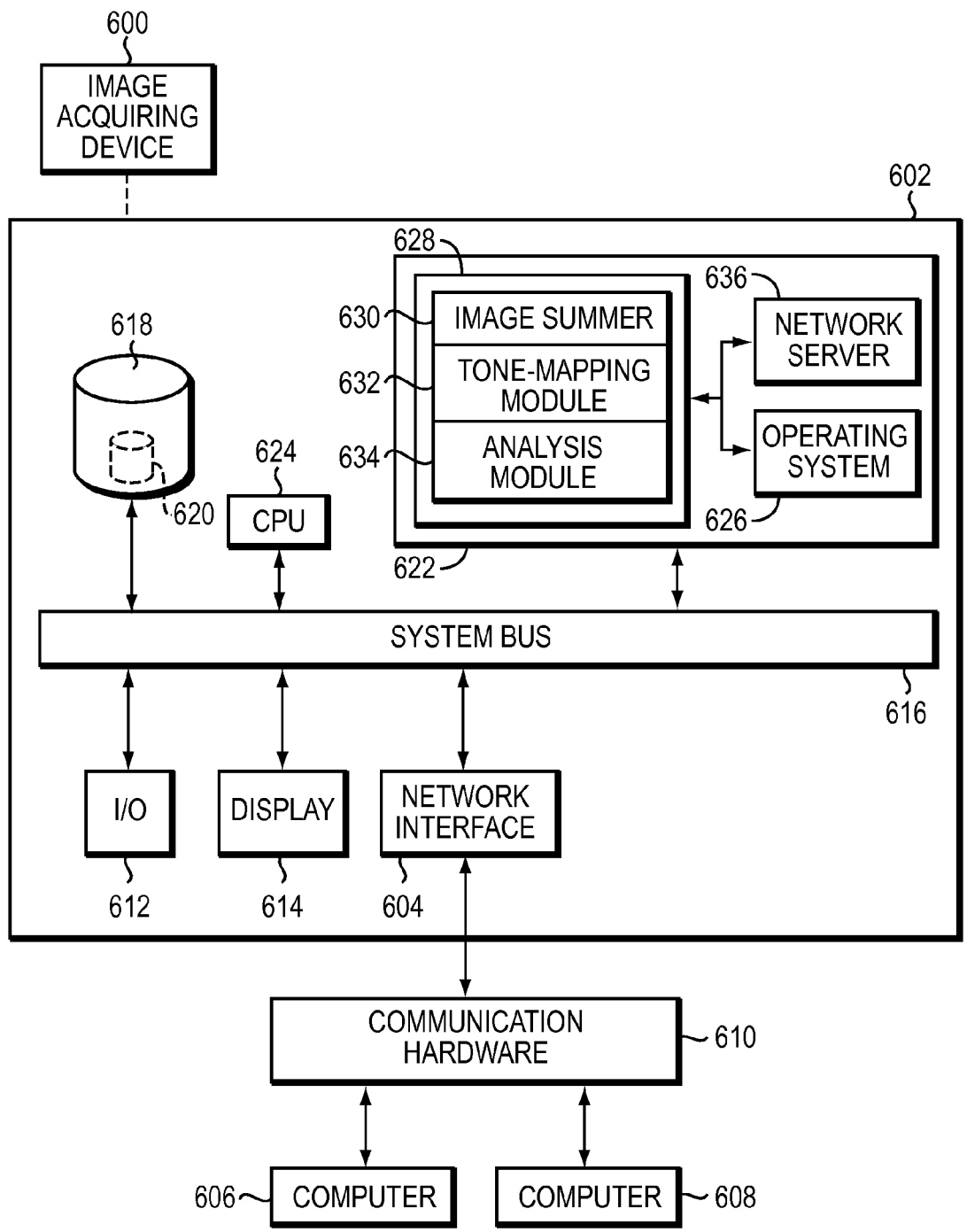
FIG. 6 schematically depicts a system for detecting low-light level faces in accordance with embodiments of the current invention.

FIG. 6 illustrates, in block-diagram form, an exemplary system for performing low-light face detection using an image acquire device 600, such as a digital camera, integrated with a computer 602 having features enabling it to perform in accordance herewith, as well as its integration into a network. The computer 602 includes a network interface 604, which interacts with other computers 606, 608 of the network via communication hardware 610. The computer 602 also includes input/output devices 612 (e.g., a keyboard, a mouse or other position-sensing device, etc.), by means of which a user can interact with the system, and a screen display 614. The computer 602 further includes a bidirectional system bus 616, over which the system components communicate, a non-volatile mass storage device (such as one or more hard disks and/or optical storage units) 618, which can contain one or more databases 620 storing the captured images, and a main (typically volatile) system memory 622. The operation of computer 602 is directed by a central-processing unit ("CPU") 624.

The main memory 622 contains instructions, conceptually illustrated as a group of modules, that control the operation of CPU 624 and its interaction with the other hardware components. An operating system 626 directs the execution of low-level, basic system functions such as memory allocation, file management and operation of mass storage devices 618. At a higher level, a service application 628, which integrates an image summer 630 and a tone-mapping module 632 with an analysis module 634, carries out the low-light face detection of the invention in the manner described above. More specifically, the image summer 630 may sum the captured images into a composite image and the tone-mapping module 632 may tone map the histogram of the intensity in a hypothesized face region of the composite image to the histogram of the intensity of a face in the facial lighting model. The face in the facial lighting model and the composite image generated from the multiple captured images may be stored within main memory 622 and/or in the mass storage device 618, e.g., within the database 620. The analysis module 634 may locate a bounded group of pixels that have a lighting distribution indicative of a face in the tone-mapped composite image and resolve facial features within the bounded group of pixels. In one embodiment, the analysis module 634 is further configured to compensate for actual or expected motion within at least some of the images. The service application 628 may include one or more additional, application-specific modules (not shown) for analyzing and characterizing the composite tone-mapped image received from the tone-mapping module 632. The service application 628 can receive requests (for tone-mapping a composite image or analyzing the tone-mapped composite image) directly from another application or a user of computer 602, or from other computers 606, 608 of the network. To enable the handling of requests from computers 606, 608, the main memory 622 contains a network-server block 636. If the network is the Internet, for example, block 636 can be a conventional web server application.

The methods and techniques describe above may be implemented in hardware and/or software. For example, suitable software may be written straightforwardly and without undue experimentation in any of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software may be implemented in Intel 80×86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of detecting a face within a camera's field of view to resolve facial features despite inadequate illumination, the method comprising:
    obtaining a plurality of images of the inadequately illuminated field of view, at least some of the images being obtained at different gain factors;
    summing the images into a composite image;
    tone-mapping the composite image based on a facial lighting model;
    locating a bounded group of pixels in the tone-mapped image having a lighting distribution indicative of a face; and
    resolving facial features within the bounded group of pixels.

2. The method of claim 1, wherein the gain factor varies with time and the images are obtained successively in time.

3. The method of claim 1, wherein the images cover the same field of view within an image frame, summing the images comprising adding pixel values at each pixel position within the image frame.

4. The method of claim 3, wherein (i) there are M images, where M>1, (ii) each of the images has a pixel value range of 0 to $N_m$, where $N_m \leq 255$, and (iii) the composite image has a pixel value range of 0 to $\Sigma_{m=1}^{m=M} N_m$.

5. The method of claim 4, wherein every pixel value in the range of 0 to $\Sigma_{m=1}^{m=M} N_m$ of the composite image is tone-mapped to a range of 0 to 255 such that a histogram of the tone-mapped composite image corresponds to a model histogram computed based on the facial lighting model.

6. The method of claim 1, wherein the facial lighting model is based on image relighting.

7. The method of claim 1, wherein the facial lighting model is a histogram lighting distribution based on average pixel values across a plurality of images of evenly lit images of faces.

8. The method of claim 1, further comprising a step of identifying, within the frame, a target region where a face is likely to be detected, the target region having borders determined at least in part by locations of previously detected face images within the field of view, the tone-mapping and locating steps being performed first within the target region.

9. The method of claim 8, wherein the target region is identified using a statistical distribution of facial positions in a plurality of previously obtained images.

10. The method of claim 9, wherein the statistical distribution is generated using Monte Carlo statistical sampling.

11. The method of claim 9, wherein the statistical distribution is updated automatically upon detection of a face in an image.

12. The method of claim 9, wherein the statistical distribution is updated manually by a user pointing and clicking at a face in the tone-mapped composite images.

13. The method of claim 1, further comprising:
    selecting one of the images as a reference image; and
    rectifying the unselected images against the reference image to compensate for motion in the composite image.

14. An apparatus for detecting a face within a camera's field of view to resolve facial features despite inadequate illumination, the apparatus comprising:
    a memory for electronically storing a plurality of digital images of the inadequately illuminated field of view, at least some of the images being obtained at different gain factors;
    an image summer for summing the images into a composite image; and
    a processor for executing:
        (a) tone-mapping module for tone mapping the composite image based on a facial lighting model; and
        (b) an analysis module for (i) locating a bounded group of pixels in the tone-mapped image having a lighting distribution indicative of a face, and (ii) resolving facial features within the bounded group of pixels.

15. The apparatus of claim 14, wherein the gain factor varies with time and the images are obtained successively in time.

16. The apparatus of claim 14, wherein the images cover the same field of view within an image frame, summing the images comprising adding pixel values at each pixel position within the image frame.

17. The apparatus of claim 16, wherein (i) the memory stores M images, where M>1, (ii) each of the images has a pixel value range of 0 to $N_m$, where $N_m \leq 255$, and (iii) the composite image has a pixel value range of 0 to $\Sigma_{m=1}^{m=M} N_m$.

18. The apparatus of claim 17, wherein the tone-mapping module tone-maps every pixel value in the range of 0 to $\Sigma_{m=1}^{m=M} N_m$ of the composite image to a range of 0 to 255 such that a histogram of the tone-mapped composite image corresponds to a model histogram computed based on the facial lighting model.

19. The apparatus of claim 14, wherein the facial lighting model is based on image relighting.

20. The apparatus of claim 14, wherein the facial lighting model is a histogram lighting distribution based on average pixel values across a plurality of images of evenly lit images of faces.

21. The apparatus of claim 14, wherein the analysis module is further configured to detect motion within at least some of the images.

* * * * *